US012735013B2

(12) United States Patent
Ganzel

(10) Patent No.: US 12,735,013 B2
(45) Date of Patent: Sep. 15, 2026

(54) HYDROMECHANICAL BRAKE MOTIVE APPARATUS

(71) Applicant: ZF Active Safety US Inc., Livonia, MI (US)

(72) Inventor: Blaise Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 481 days.

(21) Appl. No.: 18/332,241

(22) Filed: Jun. 9, 2023

(65) Prior Publication Data

US 2024/0409076 A1 Dec. 12, 2024

(51) Int. Cl.

*B60T 13/74* (2006.01)
*B60T 1/06* (2006.01)

(Continued)

(52) U.S. Cl.

CPC ............ *B60T 13/588* (2013.01); *B60T 1/065* (2013.01); *B60T 13/686* (2013.01); *B60T 17/22* (2013.01);

(Continued)

(58) Field of Classification Search

CPC .. F16D 65/18; F16D 2121/24; F16D 2125/40; F16D 2125/48; B60T 13/745; B60T 13/746

See application file for complete search history.

(56) References Cited

U.S. PATENT DOCUMENTS 5,348,123 A * 9/1994 Takahashi ............. B60T 13/745 188/162
5,682,965 A * 11/1997 Prinzler .................. F16D 65/74 188/72.4

(Continued)

FOREIGN PATENT DOCUMENTS

DE 102023108135 A1 2/2024
WO WO-9706998 A1 * 2/1997 .............. B60T 7/042

OTHER PUBLICATIONS

Machine translation, retrieved Aug. 23, 2025 (Year: 2025).*
Search Report of the corresponding German patent application dated Feb. 7, 2025, pp. 1-8.

*Primary Examiner* — Bradley T King
(74) *Attorney, Agent, or Firm* — Tarolli, Sundheim, Covell & Tummino LLP

(57) ABSTRACT

A hydraulic brake motive apparatus includes a reservoir containing hydraulic fluid. A power transmission unit selectively provides at least one of negative and positive pressure to the hydraulic fluid to generate pressurized hydraulic fluid. A caliper piston includes a piston cavity configured to selectively contain hydraulic fluid and at least a portion of the power transmission unit. The piston cavity is in selective communication with the reservoir via a reservoir passage. A motive housing contains at least a portion of each of the reservoir, the power transmission unit, and the caliper piston therein to maintain a closed-loop system for the hydraulic fluid. The motive housing defines a piston bore. The caliper piston selectively reciprocates longitudinally with respect to (Continued)

the piston bore under influence of pressurized hydraulic fluid from the power transmission unit. The reservoir, power transmission unit, and caliper piston are co-located proximate a corresponding brake pad.

19 Claims, 6 Drawing Sheets

(51) Int. Cl.

| | |
|---|---|
| ***B60T 13/58*** | (2006.01) |
| ***B60T 13/68*** | (2006.01) |
| ***B60T 17/22*** | (2006.01) |
| ***F16D 55/226*** | (2006.01) |
| ***F16D 65/18*** | (2006.01) |
| *F16D 121/04* | (2012.01) |
| *F16D 121/24* | (2012.01) |
| *F16D 123/00* | (2012.01) |
| *F16D 125/06* | (2012.01) |
| *F16D 125/40* | (2012.01) |
| *F16D 125/48* | (2012.01) |

(52) U.S. Cl.

CPC ........... *F16D 55/226* (2013.01); *F16D 65/18* (2013.01); *F16D 65/183* (2013.01); *B60T 13/745* (2013.01); *B60T 2270/88* (2013.01); *F16D 2121/04* (2013.01); *F16D 2121/24* (2013.01); *F16D 2123/00* (2013.01); *F16D 2125/06* (2013.01); *F16D 2125/40* (2013.01); *F16D 2125/48* (2013.01)

(56) References Cited

U.S. PATENT DOCUMENTS

| | | | | |
|---|---|---|---|---|
| 5,782,322 | A * | 7/1998 | Hauck | F16D 65/18 188/162 |
| 5,845,747 | A * | 12/1998 | Rike | F16D 55/228 188/264 G |
| 5,975,250 | A * | 11/1999 | Brandmeier | B60T 8/321 188/1.11 E |
| 6,457,783 | B1 * | 10/2002 | Schanzenbach | F16D 65/18 303/166 |
| 6,837,342 | B1 * | 1/2005 | Olschewski | F16D 55/228 188/72.8 |
| 8,453,803 | B2 * | 6/2013 | Cho | F16D 65/18 188/290 |
| 9,758,141 | B2 * | 9/2017 | Kim | B60T 7/20 |
| 11,267,528 | B2 * | 3/2022 | Nago | F16D 61/00 |
| 2002/0020591 | A1 * | 2/2002 | Schanzenbach | F16D 65/18 188/158 |
| 2013/0264154 | A1 * | 10/2013 | Cho | B60T 8/326 188/72.4 |
| 2015/0114769 | A1 * | 4/2015 | Kim | F16D 65/18 188/72.4 |
| 2016/0069403 | A1 * | 3/2016 | Yamasaki | F16D 65/18 188/72.1 |
| 2017/0045105 | A1 * | 2/2017 | Hofmeister | F16D 65/18 |
| 2023/0001902 | A1 * | 1/2023 | Ganzel | B60T 13/686 |
| 2023/0103320 | A1 * | 4/2023 | Yabusaki | F16D 65/28 188/72.4 |
| 2024/0052899 | A1 * | 2/2024 | Ganzel | F16D 65/18 |

* cited by examiner 162
174
172
100
102
104
106
108
110,120
122
136
138
140
142
156
164
168
170
HMB
RF
LF
RR
LR
M
P
S

HYDROMECHANICAL BRAKE MOTIVE APPARATUS

TECHNICAL FIELD

This disclosure relates to an apparatus and method for the provision of a hydromechanical brake motive apparatus to a vehicle and, more particularly, to a method and apparatus for the provision of a hydromechanical brake motive apparatus proximate a corresponding brake pad of the vehicle.

BACKGROUND

Traditional service braking systems of a vehicle are typically hydraulic fluid based systems actuated by a driver depressing a brake pedal that generally actuates a master cylinder. In turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the master cylinder with supplemental actuation pressure gradients supplied by the hydraulic modulator assembly during anti-lock, traction control, and stability enhancement modes of operation.

More recent brake designs may include brake assemblies with an electromechanical park brake feature as part of the actuator. With such a feature, the driver merely presses a button to electrically actuate the brakes into a park brake mode. Additionally, recent brake system designs may be devoid of any hydraulics. Such systems are often known as brake-by-wire (BBW) systems that electrically actuate the brakes during both service and park brake modes of operation. However, in those BBW systems, the actuating electric motors must be, overall, heavier and more expensive (in order to produce the desired braking forces) than the electric motors that would be needed to produce similar braking forces in electrically-pressurized hydraulic braking systems. Additionally, the weight of the BBW electric motors adds unsprung mass to the vehicle, which is undesirable in many use applications.

SUMMARY

In an aspect, a hydraulic brake motive apparatus is disclosed. A reservoir contains hydraulic fluid. A power transmission unit selectively provides at least one of negative and positive pressure to the hydraulic fluid to generate pressurized hydraulic fluid. A caliper piston includes a piston cavity configured to selectively contain hydraulic fluid and at least a portion of the power transmission unit. The piston cavity is in selective communication with the reservoir via a reservoir passage. A motive housing contains at least a portion of each of the reservoir, the power transmission unit, and the caliper piston therein to maintain a closed-loop system for the hydraulic fluid. The motive housing defines a piston bore. The caliper piston selectively reciprocates longitudinally with respect to the piston bore under influence of pressurized hydraulic fluid from the power transmission unit. The reservoir, power transmission unit, and caliper piston are co-located proximate a corresponding brake pad.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
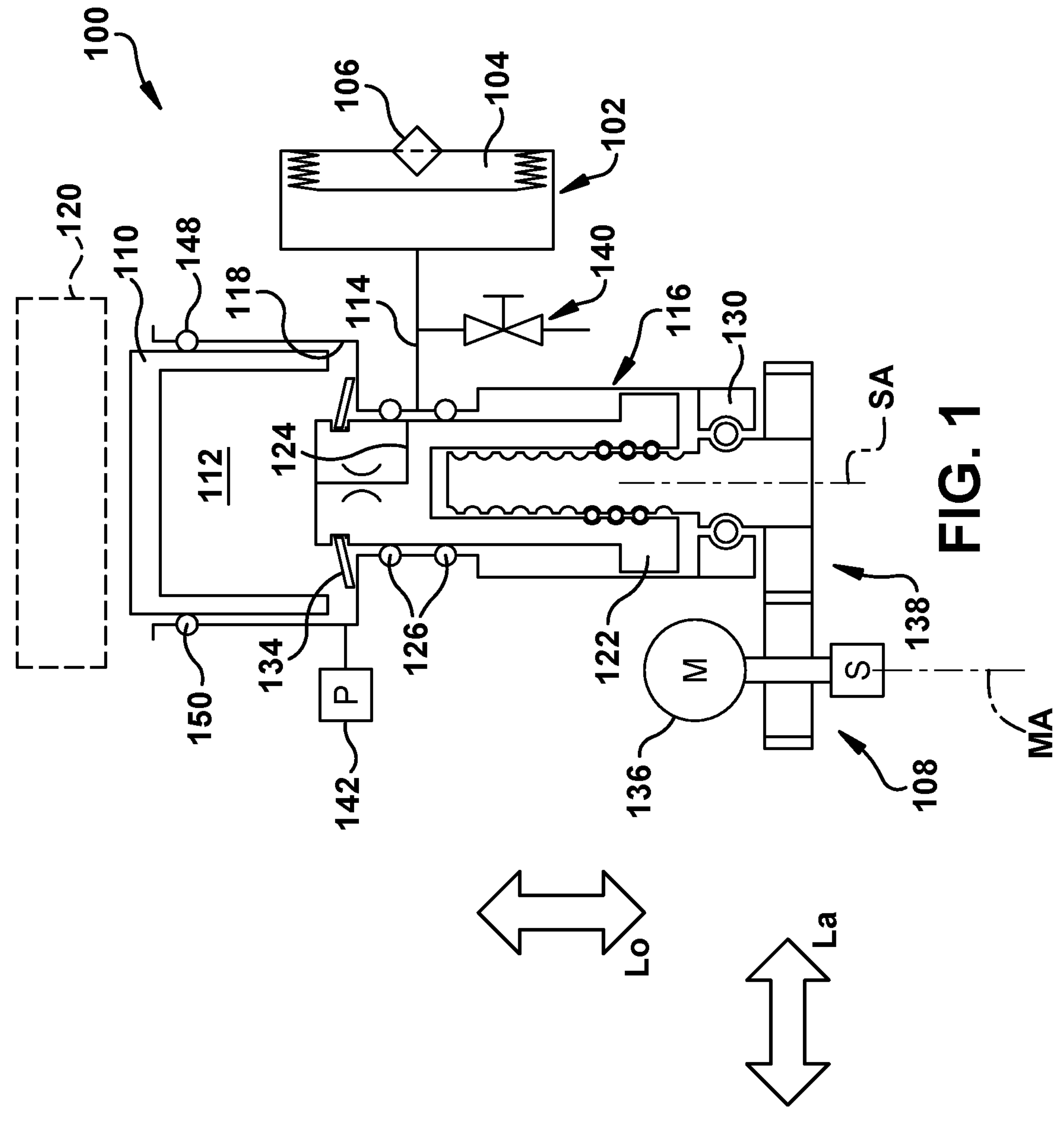
FIG. 1 is a schematic hydraulic diagram of a hydromechanical brake motive apparatus according to an aspect of the invention, in a first example arrangement.

FIG. 1 depicts a hydromechanical brake motive apparatus 100 according to an aspect of the present invention, in a first configuration. The hydraulic brake motive apparatus 100 includes a reservoir 102 containing hydraulic fluid. The reservoir 102 may at least partially enclose a volume compensator 104 of any desired type having contracted and expanded conditions (represented schematically in the Figures as being accomplished via an accordion-type folded structure). The volume compensator 104, when present, may move between the contracted and expanded conditions responsive to an amount of hydraulic fluid in the reservoir 102 in order to "fill" space in the reservoir 102 which is vacated by the hydraulic fluid routed from the reservoir 102 to other portions of the hydromechanical brake motive apparatus 100. Via filter 106, air from an ambient space can be pulled into, and pushed out from, the volume compensator 104, as desired. For example, very small increments of motion between the contracted and expanded conditions can be made by the volume compensator 104 under the influence of transient negative or positive pressure gradients developing within the reservoir during operation of the hydromechanical brake motive apparatus 100. As another example, the volume compensator 104 can expand in a longer-term fashion to facilitate motion and shifting of other portions of the hydromechanical brake motive apparatus 100 (e.g., a caliper piston) due to influences such as wearing-away of the brake pads.

A power transmission unit ("PTU") 108 selectively provides at least one of negative and positive pressure to the hydraulic fluid to generate pressurized hydraulic fluid. A caliper piston 110 includes a piston cavity 112 configured to selectively contain hydraulic fluid and at least a portion of the PTU 108, as described in more detail below. The piston cavity 112 is in selective fluid communication with the reservoir 102 via a reservoir passage 114. A motive housing (shown schematically at 116 in FIG. 1) contains at least a portion of each of the reservoir 102, the PTU 108, and the caliper piston 110 therein to maintain a closed-loop system for the hydraulic fluid.

The motive housing 116 defines a piston bore 118. For example, in some use environments, the piston bore 118 can be machined into the motive housing 116 from a rotor-facing surface thereof. The caliper piston 110 selectively reciprocates longitudinally with respect to the piston bore 118 under influence of pressurized hydraulic fluid from the PTU 108, to perform brake applying and releasing procedures, since the brake pad(s) is/are moved by action of the caliper piston 110. The "longitudinal" direction, as used herein, is substantially parallel to the piston bore 118 and is represented by arrow "Lo" in FIG. 1.

The reservoir 102, PTU 108, and caliper piston 110 are co-located proximate a corresponding brake pad (shown schematically at 120 in FIG. 1) and in selective direct or indirect contact therewith to effectuate a desired braking action. That is, the hydromechanical brake motive apparatus 100 combines the advantages of the robust and power-efficient operation of a hydraulic brake system with the convenience and size benefits of an electric brake motor. A user can regulate unsprung mass of the vehicle through use of the hydromechanical brake motive apparatus 100 as compared to certain prior art alternatives, and the hydromechanical brake motive apparatus 100 also may include smaller/lighter and/or less expensive components than known in the prior art, such as, but not limited to, sensors and force-transmitting assemblies. The hydromechanical brake motive apparatus 100 may be provided to a vehicle manufacturer as a closed, ready-for-installation unit such that no hydraulic fluid needs to be supplied or charged during vehicle assembly; instead, the assembled hydromechanical brake motive apparatus 100 can be simply and neatly mounted adjacent the vehicle wheel as part of the brake caliper and connected electrically to the vehicle. The unitary nature of the hydromechanical brake motive apparatus 100 will be further discussed below at least with reference to FIGS. 5-7.

Figure 2:
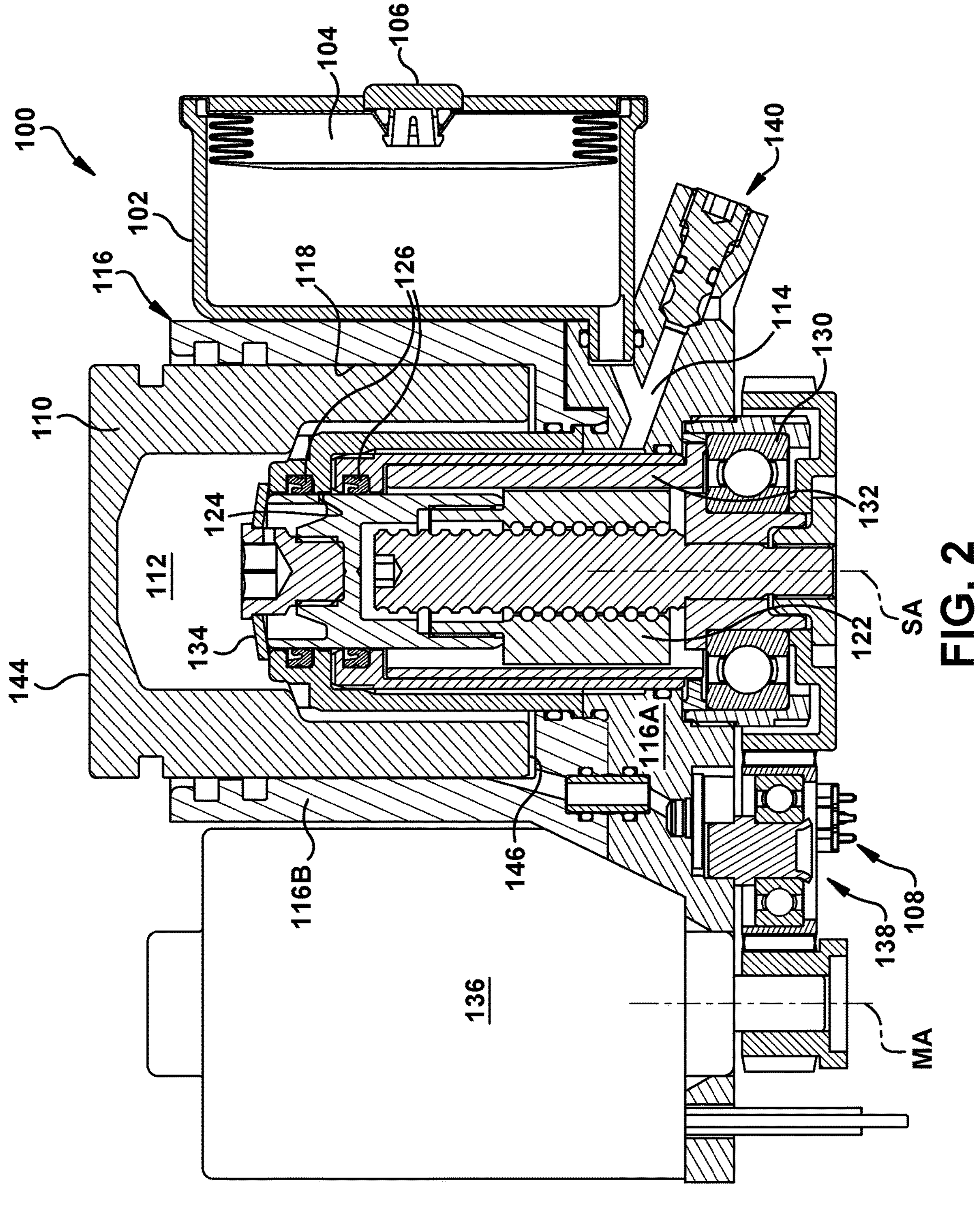
FIG. 2 is a schematic cross-sectional view of the hydromechanical brake motive apparatus of FIG. 1.

Referring now to FIGS. 1-2, the PTU 108 of the hydromechanical brake motive apparatus 100 includes a plunger 122 configured for longitudinally reciprocal motion with respect to the piston cavity 112 to selectively reciprocate the caliper piston 110 via pressurization of hydraulic fluid located within the piston cavity 112. Though the plunger 122 is shown schematically as being a single piece in FIG. 1, it is contemplated that a multi-component plunger 122 could be provided, such as that shown in FIG. 2.

As shown here, the plunger 122 may include a plunger passage 124 configured for selective fluid communication with the reservoir passage 114 to facilitate desired opening and closing of a fluid path between the piston cavity 112 and the reservoir 102. To that end, a plurality of annular plunger seals 126 can be provided to encircle the plunger 122, such as by being maintained in a corresponding plunger seal groove on an outer surface of the plunger 122 and/or an inner surface of the piston bore 118. In this manner, an annular space is provided about a circumference of the plunger 122, such that, when plunger passage 124 is located longitudinally between the plunger seals 126 during reciprocal longitudinal travel of the plunger 122, the piston cavity 112 is in fluid communication with the reservoir passage 114. Fluid communication between the piston cavity 112 and the reservoir passage 114 may be desirable, for example, such that the hydromechanical brake motive apparatus 100 system can automatically pull hydraulic fluid from the reservoir 102 to maintain a desired clearance between the brake rotor 156 and the brake pad 120, even after some wearing away of the brake pad 120 occurs during the lifetime of the electromechanical brake motive apparatus 100. (When the brake pad 120 is replaced with a fresh, thicker brake pad [not shown], the hydromechanical brake motive apparatus 100 can be controlled to "reset" and return a portion of hydraulic fluid from the piston cavity 112 to the reservoir 102 through the reservoir passage 114.)

The PTU 108 also includes a spindle 128 located at least partially within the piston bore 118, the spindle 128 rotating to selectively reciprocate the plunger 122 to pressurize hydraulic fluid located within the piston cavity 112 and responsively urge the caliper piston 110 (and connected brake pad 120) toward (under increasing pressurization) or away from (under decreasing pressurization) a brake rotor 156 and accordingly apply or release braking force. The spindle 128 extends substantially longitudinally within at least a portion of the piston bore 118 and rotates about a longitudinally oriented spindle axis ("SA", in FIG. 1). As shown in the Figures, at least a portion of the spindle 128 may be completely laterally surrounded by the piston bore 118.

The spindle 128 may be mounted within the motive housing 116 by a bearing 130, or otherwise maintained in a rotatable condition, in any desired fashion. As shown in FIG. 2, at least one antirotation rail 132 may extend parallel to the spindle 128 to resist rotary motion of the plunger 122 around the spindle 128 during reciprocal motion of the plunger 122 (e.g., by resisting rotary motion of the ball nut connected to the plunger 122). At least one Belleville washer or disk spring 134 may be provided to a portion of the plunger 122 spaced apart from the spindle 128. When the piston bore 118 includes a "shoulder" near the piston cavity 112, the disk spring 134 can selectively contact or rest against that shoulder to cushion a "bottoming out" motion of the plunger 122 with respect to the piston cavity 112, the bearing 130, or any other structure of the hydromechanical brake motive apparatus 100.

The PTU 108 may also include a motor 136 for selectively driving the spindle 128 in rotary motion to urge the plunger 122 into the described longitudinally reciprocal motion with respect to the piston cavity 112. The motor 136 may be an electric motor 136, of any desired type. The sensor "S" indicates a status, position (including rotational position), drive direction, drive amount, or other characteristic of the electric motor 136 to a broader system including the hydromechanical brake motive apparatus 100. Information from the sensor "S" can be used to control the motor 136 and/or to calculate a position of the plunger 122.

Although it is contemplated that the motor 136 could directly drive rotation of the spindle 128, the Figures depict situations in which the motor 136 exerts rotary motion about a longitudinal motor axis ("MA", in FIG. 1) spaced laterally apart from a longitudinal spindle axis SA of the spindle. The term "lateral" is used herein to indicate a direction substantially perpendicular to the longitudinal direction, and is represented by the arrow labeled "La" in FIG. 1. This "side drive" physical arrangement of the PTU 108 may be provided, for example, for space-saving, user access, cost, device footprint, or any other desired reasons. In order to transfer rotary motion from the motor 136 to the spindle 128 the PTU 108 includes a PTU power transmitter (shown schematically at 138) drivingly coupling the motor 136 to the spindle 128.

The PTU power transmitter 138 may be of any desired type, and can be provided by one of ordinary skill in the art for a particular use environment of the hydromechanical brake motive apparatus 100. For example, the PTU power transmitter 138 could be at least a selected one of a gear train (e.g., a gear drive with an idler) and a belt drive mechanism.

As is shown especially in FIG. 2, the motive housing 116 may be a two-piece motive housing, with a first motive housing piece 116A at least partially enclosing the PTU 108. In the FIG. 2 arrangement, the first motive housing piece 116A at least partially encloses the plunger 122 and/or spindle 128. A second motive housing piece 1168, then, may define a majority of the piston bore 118, with the caliper piston 110 being spaced apart, such as being spaced at least partially longitudinally apart, from the first motive housing piece 116A. In some configurations of the hydromechanical brake motive apparatus 100, the motor 136 may be affixed to an exterior surface of the two-piece motive housing 116, comprising 116A and 1168. This is the arrangement shown in FIG. 2.

Again as shown in FIG. 2, the hydromechanical brake motive apparatus 100 may include a bleed port 140 in fluid communication with the piston cavity 112. When present, the bleed port 140 is selectively operable to permit fluid communication between the piston cavity 112 and an ambient space, outside the hydromechanical brake motive apparatus 100. In some use environments, the bleed port 140 will only be used during an initial evacuation and filling operation, during manufacture of the hydromechanical brake motive apparatus 100, then sealed off in any desired manner without being opened again in the life of the hydromechanical brake motive apparatus 100. The bleed port 140, when present, therefore assists with keeping the hydromechanical brake motive apparatus 100 as a closed system, being provided at manufacture with all of the hydraulic fluid needed for the life of the apparatus 100.

A pressure sensor 142 may be provided in fluid communication with the piston bore 118 for sensing a pressure of the hydraulic fluid therein and responsively producing a pressure signal, which can be used during operation of the hydromechanical brake motive apparatus for any desired purpose, such as, but not limited to, determining a desired drive direction and amount for the motor 136 to rotate the spindle 128.

The caliper piston 110 may include (as labeled in FIG. 2) a piston face 144 oppositely disposed from a piston rim 146, with the piston rim 146 being laterally adjacent to the piston cavity 112. This type of caliper piston 110 is called a "cup" piston, with the piston cavity 112 being defined within an "interior" of the "cup". At least in the configuration of FIG. 2, the pressurized hydraulic fluid selectively exert force upon the piston rim 146 to selectively reciprocate the caliper piston 110. This area is schematically indicated by oval "F" in FIG. 2. It is contemplated, though, that pressurized hydraulic fluid could also or instead exert force upon a portion of the piston cavity 112 located "deeper" in the "cup", spaced apart from the piston rim 146, for particular use environments, as desired and configured by one of ordinary skill in the art.

As shown schematically in the Figures, the piston cavity 112 may be located at least partially within the piston bore 118. Here, the piston cavity 112 is largely located laterally within the piston bore 118, during most phases of operation of the hydromechanical brake motive apparatus 100. Under influence of pressurized fluid generated by the PTU 108 (such as by motion of the plunger 122 driven by the spindle 128), the caliper piston 110 reciprocates longitudinally within the piston bore 118 of the motive housing 116 during use of the hydromechanical brake motive apparatus 100. The piston bore 118 is open to ambient space (e.g., longitudinally adjacent the brake pad 120, as shown in FIG. 1) such that at least a portion of the caliper piston 110 (e.g., the piston face 144) protrudes longitudinally from the motive housing 116 at a location spaced apart from the PTU 108. As a result, the hydromechanical brake motive apparatus 100 can be mounted adjacent a brake pad 124 selective application of longitudinal force thereto in order to apply and release a wheel break, as will be discussed below.

To facilitate contact (direct or indirect) between the brake pad 120 and the piston face 144 of the caliper piston 110 while substantially preventing the escape of pressurized hydraulic fluid from the closed hydromechanical brake motive apparatus 100 system, at least one of an internal wall of the piston bore 118 and an external surface of the caliper piston 110 may include an annular groove 148 in fluid communication with the internal space of the piston bore 118 and circumferentially surrounding the caliper piston 110. A caliper piston seal 150, of any desired type, may be retained at least partially within the annular groove 148 for concurrent contact with the internal wall of the piston bore 118 and the external surface of the caliper piston 110 to resist egress of hydraulic fluid from the piston cavity 112 or any other portion of the hydromechanical brake motive apparatus 100, past the caliper piston 110, and out of the piston bore 118 during reciprocal motion of the caliper piston 110 with respect to the piston bore 118.

Figures 3, 4:
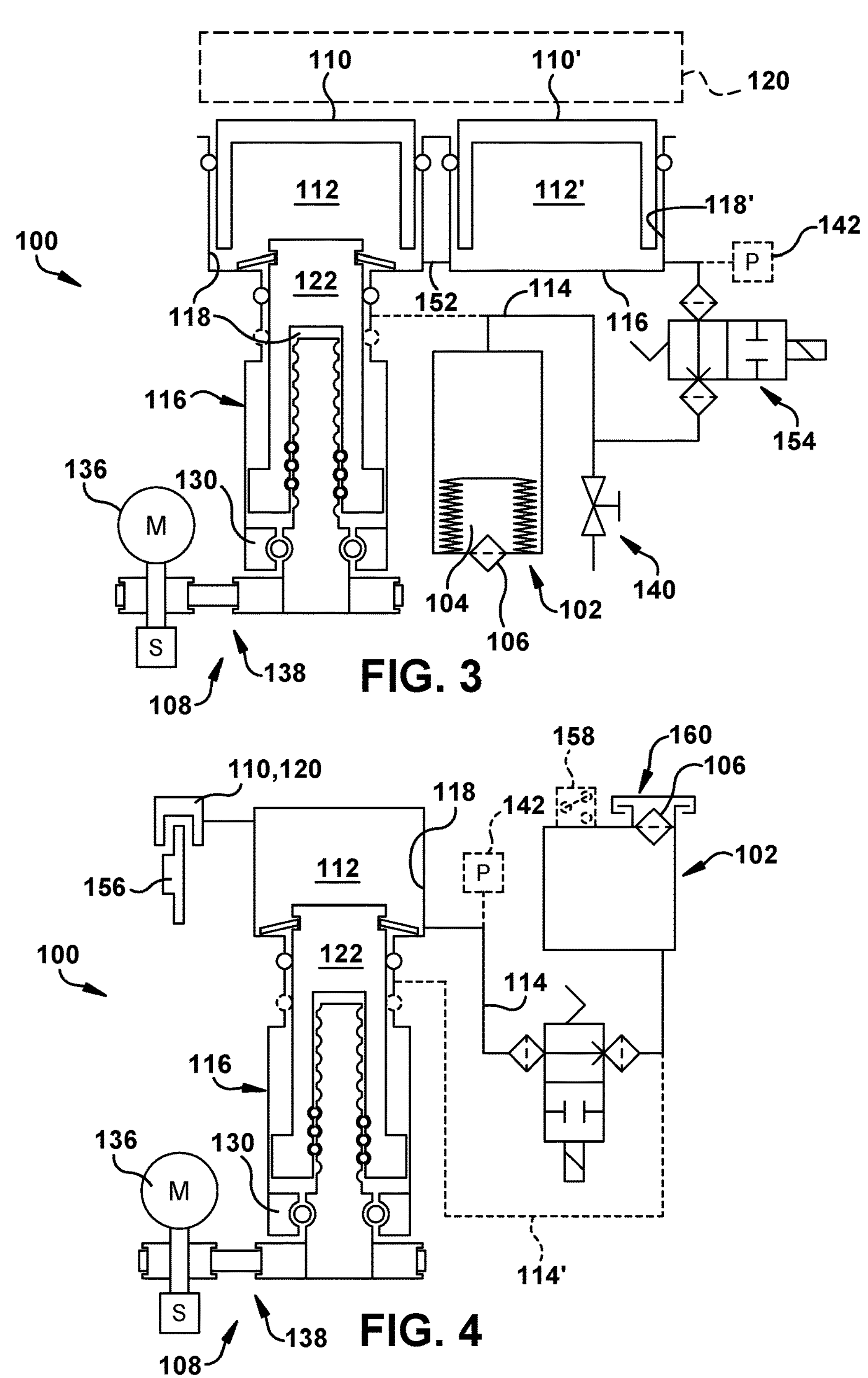
FIG. 3 is a schematic hydraulic diagram of the hydromechanical brake motive apparatus of FIG. 1, in a second example arrangement.
FIG. 4 is a schematic hydraulic diagram of a hydromechanical brake device including the hydromechanical brake motive apparatus of FIG. 1, in a third example arrangement.

Turning now to FIG. 3, it can be seen that a second caliper piston 110' is provided to the hydromechanical brake motive apparatus 100, with at least a portion of the second piston bore 118' being defined by the motive housing 116, yet the plunger 122 is absent from the second piston bore 118'. Instead, the second piston bore 118' is pressurized at least partially via movement of pressurized hydraulic fluid from the piston cavity 112 through transfer passage 152. A normally open solenoid valve 154 is hydraulically interposed between the second piston bore 118' and the reservoir 102, to help manage routing of pressurized hydraulic fluid between the two caliper pistons 110, 110' of the configuration of the hydromechanical brake motive apparatus 100 shown in FIG. 3. In fact, the portion of reservoir passage 114 in FIG. 3 leading from the reservoir 102 to the piston bore 118 containing at least a portion of the PTU 108 is optional (as represented by dotted line in FIG. 3) could be omitted from the configuration of the hydromechanical brake motive apparatus 100 shown in FIG. 3 altogether, with hydraulic fluid being routed from the reservoir 102 in directly to the (first) piston bore 118, through the normally open solenoid valve 154 and second piston bore 118'.

In the configuration of the hydromechanical brake motive apparatus 100 shown in FIG. 3, the two caliper pistons 110, 110' are reciprocally moved longitudinally with respect to a single brake pad 120 in a concerted or "parallel" manner. As a result, the FIG. 3 configuration provides for a balanced braking force to be cooperatively exerted upon the brake pad 120 by both the caliper pistons 110, 110', which may be desired for certain use environments of the hydromechanical brake motive apparatus 100.

To summarize the FIG. 3 arrangement of the hydromechanical brake motive apparatus 100, the caliper piston 110 is a first caliper piston 110 and the piston bore 118 is a first piston bore 118. The hydromechanical brake motive apparatus 100 includes a second piston bore 118' defined at least partially by the motive housing 116. The second piston bore 118' is spaced laterally apart from the first piston bore 118.

A second caliper piston 110' is configured for selectively reciprocating longitudinally with respect to the second piston bore 118' under influence of pressurized hydraulic fluid from the PTU 108. The first pad side of the brake pad 120 is in selective contact with both the first and second caliper pistons 110, 110'. The reciprocal longitudinal motion of the first and second caliper pistons 110, 110' selectively places the second side of the brake pad 120 into contact with the brake rotor 156 to provide a braking action thereto.

Figure 5:
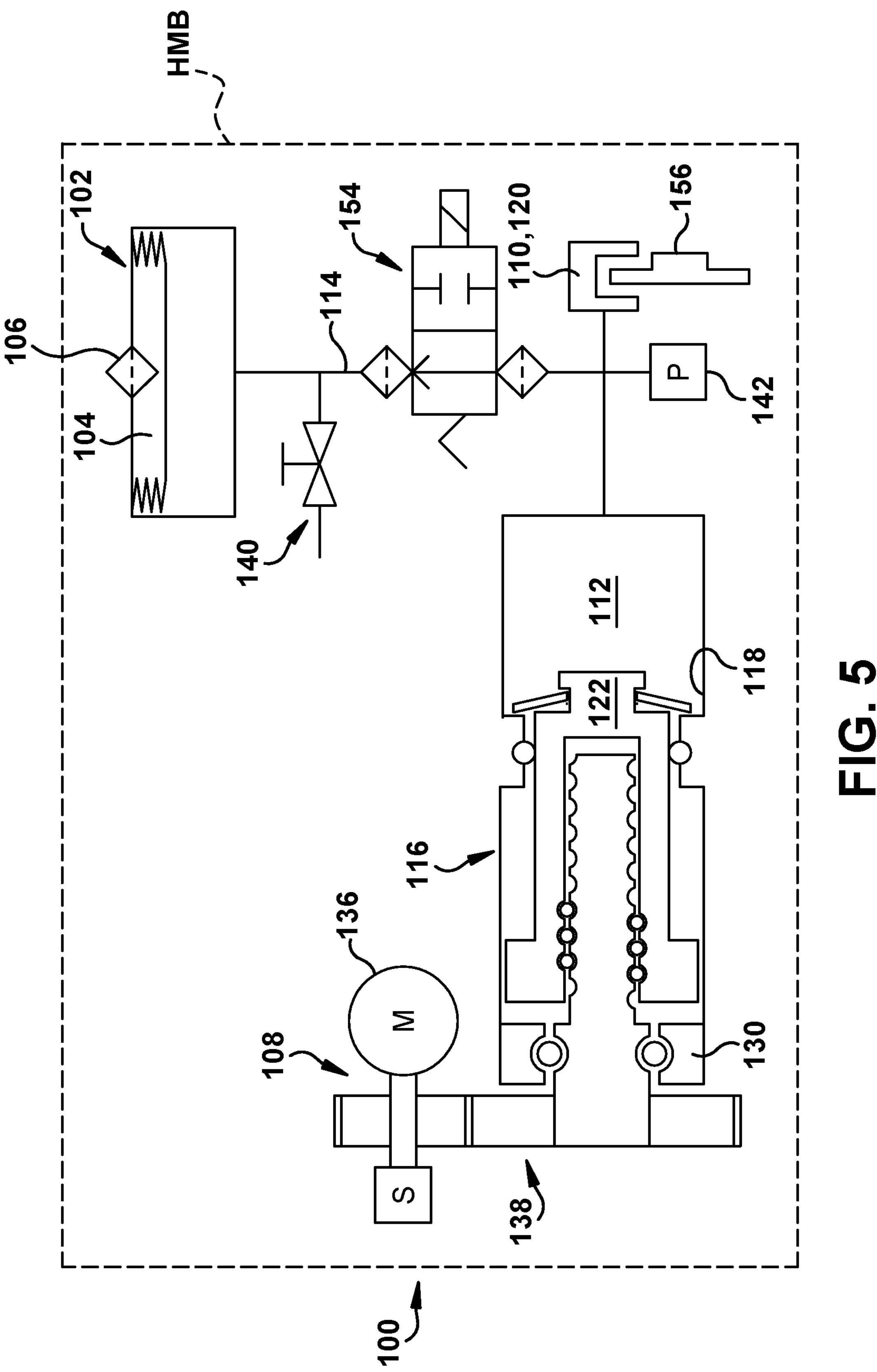
FIG. 5 is a schematic hydraulic diagram of a hydromechanical brake device including the hydromechanical brake motive apparatus of FIG. 1, in a fourth example arrangement.
Figure 6:
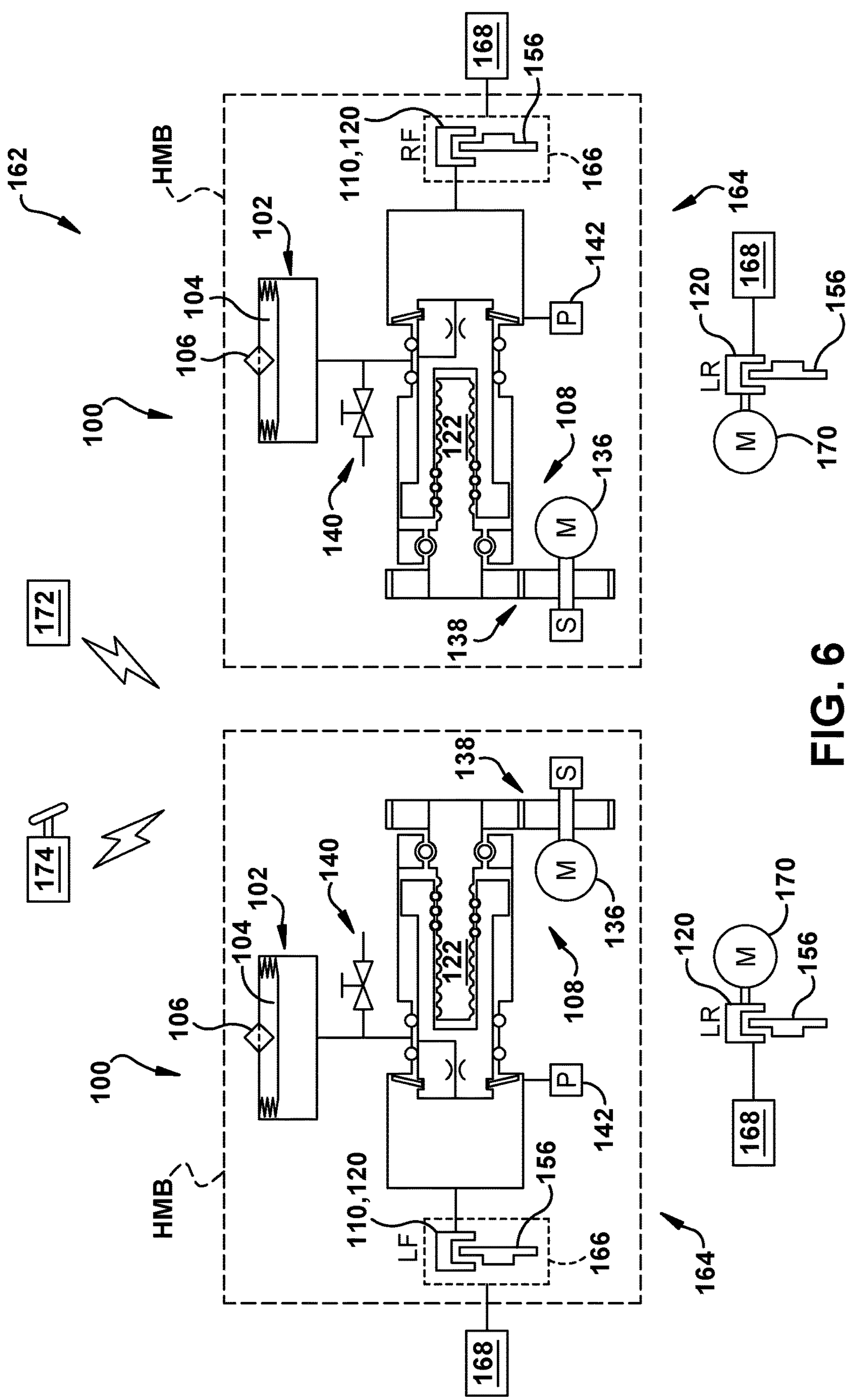
FIG. 6 is a schematic hydraulic diagram of a first example brake system including at least one hydromechanical brake device including the hydromechanical brake motive apparatus of FIG. 1.
Figure 7:
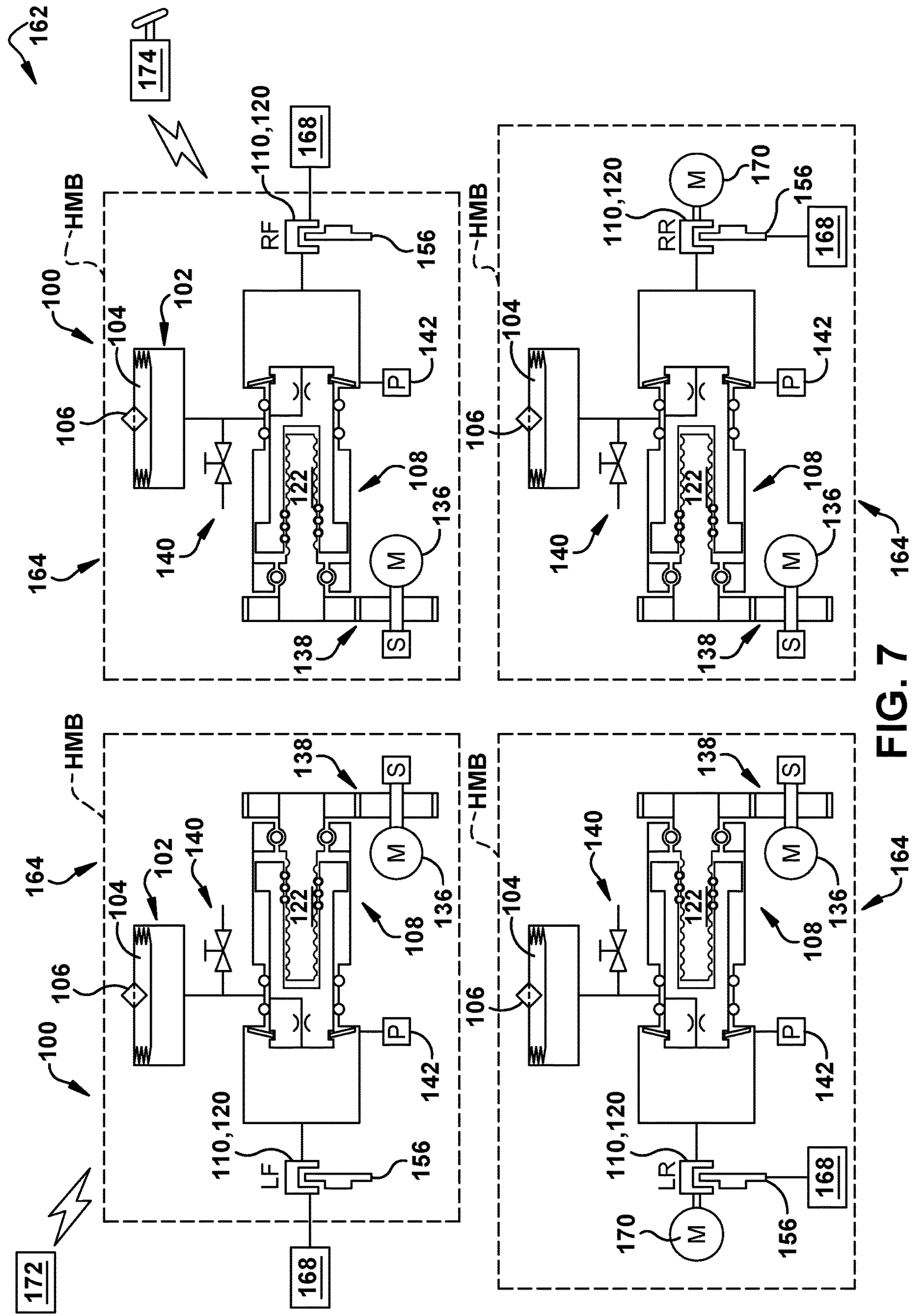
FIG. 7 is a schematic hydraulic diagram of a second example brake system at least one hydromechanical brake device including the hydromechanical brake motive apparatus of FIG. 1.

It should be noted that the hydromechanical brake motive apparatuses 100 shown in at least FIGS. 5-7 schematically depict the caliper piston 110 and the brake pad 120 as a single "C"-shaped structure poised to selectively clamp onto the rim of a brake rotor 156. One of ordinary skill in the art will appreciate that this representation is provided for ease of depiction and does not represent an actual spacing-apart of the caliper piston 110 from the piston bore 118. Instead, these so-depicted arrangements will instead appear more akin to the structures in FIGS. 1-2, and can be readily provided by one of ordinary skill in the art for a particular use application, following the teachings and disclosures herein.

The hydromechanical brake motive apparatuses 100 of FIGS. 3-5, in fact, all are shown as including at least one normally-open solenoid valve 154 interposed fluidically between the reservoir 102 and the piston cavity 112. When present, the solenoid valve 154 is operable to selectively block flow of hydraulic fluid between the reservoir 102 and the piston cavity 112. For example, the solenoid valve 154 could be held energized (i.e., closed) during braking functions in order to "block off" the reservoir 102 from the pressurized hydraulic fluid developed within the piston bore 118 by the plunger 122. The presence of a normally open solenoid valve 154 may therefore facilitate the use of a shorter plunger 122 and spindle 128 in the hydromechanical brake motive apparatus 100 than would otherwise be used, which could result in cost, weight, and volume savings for the hydromechanical brake motive apparatus 100 as a whole. A normally open solenoid valve 154, when present, may also allow equalization of pressure between the piston bore 118 and the reservoir 102 if there is a power loss failure, and therefore the hydromechanical brake motive apparatus 100 is not undesirably backdriven and/or inclined to introduce unwanted frictional load on the system in such a power loss failure event. Additionally, when present, the solenoid valve 154 can provide a "zero drag" function similar to that provided by the plunger passage 124, which is omitted from the plungers 122 of FIGS. 3-5. One of ordinary skill in the art can readily provide any desired number, type, and configuration of valves, including, but not limited to, at least one normally open solenoid valve 154 for a particular use environment of a hydromechanical brake motive apparatus 100.

The hydromechanical brake motive apparatus 100 of FIG. 4 differs from those previously described with reference to FIGS. 1-3 at least in that the reservoir 102 does not include a volume compensator 104, and is shipped to a vehicle assembler "dry", for evac and fill bleeding during assembly onto the vehicle. Instead, one of ordinary skill in the art can use level sensor 158, along with access port 160 of the reservoir 102, in order to monitor and/or manually change an amount of hydraulic fluid held within the reservoir 102 at various stages of operation during the lifetime of the hydromechanical brake motive apparatus 100. The optional pressure sensor 142 and a second reservoir passage 114', entering the piston bore 118 at a location spaced apart from that at which the reservoir passage 114 interfaces with the piston bore 118, can also assist a user with achieving desired hydraulic fluid routing for a particular use application.

FIG. 5, then, schematically represents a version of the hydromechanical brake motive apparatus 100 including both a closed reservoir 102 having a volume compensator 104, and a normally open solenoid valve 154 and pressure sensor 142 for routing hydraulic fluid between the piston bore 118 and the reservoir 102 in a desired manner. (For example, the features of the solenoid valve 154 previously mentioned would continue to apply to that shown as part of the hydromechanical brake motive apparatus 100 of FIG. 5.) The hydromechanical brake motive apparatus 100 of FIG. 5 is depicted schematically as being enclosed within dashed line "HMB" to emphasize its unitary nature, being provided as a single component for assembly into a broader vehicle.

Referring now to FIG. 6, the relevant braking portions of a vehicle are shown schematically at 162. In the vehicle 162 shown in FIG. 6, the front brakes "RF" and "LF" each include a hydromechanical brake motive apparatus 100 proximate a corresponding brake pad 120. In other words, the hydromechanical brake motive apparatus says 100 are each mounted directly adjacent to the respective right or left front brake, as labeled in FIG. 6. The hydromechanical brake motive apparatuses 100 shown schematically in FIGS. 6-7 are similar to those depicted in FIGS. 1-2 and described in detail above. However, it is contemplated that any suitable hydromechanical brake motive apparatus 100 according to the present invention, whether or not included explicitly in the Figures and text of this application, could be employed in any desired use environment, under the principles and concepts disclosed herein.

Again as indicated via dashed lines HMB in FIGS. 6-7, a hydromechanical brake device 164 includes any desired hydromechanical brake motive apparatus 100, a brake rotor 156, and a brake pad 120 having a first pad side adjacent, and selectively contacted by, the caliper piston 110. The reciprocal longitudinal motion of the caliper piston 110 selectively places a second side of the brake pad 120, longitudinally opposite the first side of the brake pad 120, into contact with the brake rotor 156 to provide a braking action thereto. A caliper housing (shown schematically at 166 in FIGS. 6-7) at least partially encloses the caliper piston 110, the brake pad 120, and the brake rotor 156, to maintain the brake pad 120 and brake rotor 156 in a desired position relative to a corresponding vehicle wheel to be braked. As previously mentioned, the hydromechanical brake motive apparatus 100 is located immediately adjacent to the vehicle wheel (shown schematically at 168 in FIGS. 6-7), and therefore, the benefits of hydraulic braking are realized concurrently with only an electrical line being run out to the wheel area from the control/central vehicle area—the user/designer is not required to accommodate and maintain hydraulic lines running to each wheel brake from the central vehicle area.

In the FIG. 6 vehicle 162, the left and right rear brakes each include brake pads 120 and brake rotors 156, but these rear brakes are powered purely electrically (omitting all hydraulic fluid), via standalone motors 170. The rear brakes shown in FIG. 6 may be service and/or parking brakes; particular vehicles may be under legal requirements and/or design conventions which restrict the use of hydraulically-actuated parking brakes on certain wheels, thus making the standalone motors 170 useful on those wheels.

Similarly, in the vehicle 162 depicted in FIG. 7, the left and right rear wheels 168 each have a hydromechanical brake device 164, like the left and right front wheels 168 in the vehicle 162 of FIG. 7. However, the left and right rear wheels each also include standalone motors 170 (which can be low-power motors) for use in supplementing or supplanting the hydromechanical brake motive apparatuses 100 of those wheels, in at least one of a normal non-failure braking mode and a backup braking mode. One of ordinary skill in the art can readily provide suitable numbers and types of brakes, electrically and/or hydromechanically powered, for a particular use environment.

As depicted in FIGS. 6-7, a vehicle 162 can include at least one wheel 168 and at least one hydromechanical brake device 164, with each hydromechanical brake device 164 being operatively associated with, and co-located in proximity to, a corresponding wheel 168. An electronic control unit 172 may be provided to the vehicle 1162 and be configured to control operation of at least one of the PTU 108 of the at least one hydromechanical brake device 164, and any electric standalone motors 170, on the same or different wheel as at least one hydromechanical brake device 164. While one electronic control unit 172 is shown schematically in FIGS. 6-7 as controlling operation of all four wheel brakes in those Figures, it is contemplated that a second electronic control unit, not shown, may be provided for redundancy, ease of control, or any other reason. For example, when a second electronic control unit is provided, each electronic control unit could control a PTU 108 of one hydromechanical brake motive apparatus 100 along with the diagonally arranged one of any rear standalone motor 170 that is provided. At least one electronic control unit 172 may be operable to receive a signal from sensor S, pressure sensor 142, level sensor 158, or any other indicator component and control application of at least one wheel brake accordingly.

Also as shown in FIGS. 6-7, each vehicle 162 may include a deceleration signal transmitter 174 configured to produce a braking command signal responsive to at least one of actuation by a vehicle operator and actuation by an autonomous vehicle controller (not shown). That is, as shown in FIGS. 6-7, the deceleration signal transmitter 174 may include a brake pedal which is manipulable by a vehicle operator to indicate a desired braking command. The deceleration signal transmitter 174 then translates that desired braking command from the vehicle operator into a braking command signal that is sent, in a wired or wireless manner, to other components of the vehicle 162 for use in operating the brakes in a normal, non-failure braking mode. Alternatively, and particularly when the vehicle 162 is at least partially autonomous, the autonomous vehicle controller may actuate the deceleration signal transmitter 174 or otherwise generate a suitable braking command signal responsive to a desired application or release of one or more brakes in the autonomous braking mode. The electronic control unit 172, when present, controls at least one of the PTUs 108, other components of the hydromechanical brake device 164 (e.g., a valve), any standalone motor 170, or any other component of the vehicle 162 as desired, responsive to receiving the braking command signal, regardless of the source of that braking command signal.

It is contemplated that the brake system 100 may include any desired combination of hydraulic wheel brakes, electric wheel brakes, power transmission unit types, control schemes, and any other configuration as desired by one of ordinary skill in the art for use with the hydromechanical brake motive apparatus 100. While left, right, front, and rear brake designators are used here for ease of description, one of ordinary skill in the art can readily provide any desired type, number, or combination of brake types for any one or more wheels of a particular vehicle.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A hydromechanical brake motive apparatus, comprising:

a reservoir containing hydraulic fluid;

a power transmission unit for selectively providing at least one of negative and positive pressure to the hydraulic fluid to generate pressurized hydraulic fluid;

a caliper piston including a piston cavity configured to contain hydraulic fluid and at least a portion of the power transmission unit, the piston cavity being in selective communication with the reservoir via a reservoir passage; and a motive housing containing at least a portion of each of the reservoir, the power transmission unit, and the caliper piston therein to maintain a closed-loop system for the hydraulic fluid, the motive housing defining a piston bore, and the caliper piston selectively reciprocating longitudinally with respect to the piston bore under influence of pressurized hydraulic fluid from the power transmission unit;

wherein the reservoir, power transmission unit, and caliper piston are co-located proximate a corresponding brake pad;

the power transmission unit including;

a plunger configured for longitudinally reciprocal motion with respect to the piston cavity to selectively reciprocate the caliper piston via pressurization of hydraulic fluid located within the piston cavity;

a spindle located at least partially within the piston bore, the spindle selectively reciprocating the plunger, the plunger moving longitudinally relative to the spindle; and a motor for selectively driving the spindle in rotary motion to urge the plunger into the longitudinally reciprocal motion with respect to the piston cavity.

2. The hydromechanical brake motive apparatus of claim 1, wherein the motor is an electric motor.

3. The hydromechanical brake motive apparatus of claim 1, wherein the motor exerts rotary motion about a longitudinal motor axis spaced laterally apart from a longitudinal spindle axis of the spindle, and wherein the power transmission unit includes a PTU power transmitter drivingly coupling the motor to the spindle.

4. The hydromechanical brake motive apparatus of claim 1, wherein at least a portion of the spindle is completely laterally surrounded by the piston bore.

5. The hydromechanical brake motive apparatus of claim 3, wherein the PTU power transmitter is a selected one of a gear train and a belt drive mechanism.

6. The hydromechanical brake motive apparatus of claim 1, including a bleed port in fluid communication with the piston cavity, the bleed port being selectively operable to permit fluid communication between the piston cavity and an ambient space.

7. The hydromechanical brake motive apparatus of claim 1, wherein the reservoir at least partially encloses a volume compensator having contracted and expanded conditions, the volume compensator moving between the contracted and expanded conditions responsive to an amount of hydraulic fluid in the reservoir.

8. The hydromechanical brake motive apparatus of claim 1, including a pressure sensor in fluid communication with the piston bore for sensing a pressure of the hydraulic fluid therein and responsively producing a pressure signal.

9. The hydromechanical brake motive apparatus of claim 1, wherein the caliper piston includes a piston face oppositely disposed from a piston rim, the piston rim being laterally adjacent to the piston cavity, and the pressurized hydraulic fluid selectively exerting force upon the piston rim to selectively reciprocate the caliper piston.

10. The hydromechanical brake motive apparatus of claim 1, including at least one antirotation rail extending parallel to the spindle to resist rotary motion of the plunger around the spindle during reciprocal motion of the plunger.

11. The hydromechanical brake motive apparatus of claim 1, including a solenoid valve interposed fluidically between the reservoir and the piston cavity, the solenoid valve being operable to selectively block flow of hydraulic fluid between the reservoir and the piston cavity, the solenoid being of a normally-open type.

12. The hydromechanical brake motive apparatus of claim 1, wherein the motive housing is a two-piece motive housing, with a first motive housing piece at least partially enclosing the power transmission unit and a second motive housing piece defining a majority of the piston bore, the caliper piston being spaced apart from the first motive housing piece.

13. The hydromechanical brake motive apparatus of claim 1, wherein the motive housing is a two-piece motive housing, with a first motive housing piece at least partially enclosing the power transmission unit and a second motive housing piece defining a majority of the piston bore, the caliper piston being spaced apart from the first motive housing piece, and the motor being affixed to an exterior surface of the two-piece motive housing.

14. The hydromechanical brake motive apparatus of claim 1, wherein the caliper piston reciprocates longitudinally within the piston bore of the motive housing, the piston bore being open to ambient space such that at least a portion of the caliper piston protrudes longitudinally from the motive housing at a location spaced apart from the power transmission unit.

15. The hydromechanical brake motive apparatus of claim 1, wherein at least one of an internal wall of the piston bore and an external surface of the caliper piston includes an annular groove in fluid communication with the internal space of the piston bore and circumferentially surrounding the caliper piston, and a caliper piston seal is retained at least partially within the annular groove for concurrent contact with the internal wall of the piston bore and the external surface of the caliper piston to resist egress of hydraulic fluid from the piston cavity past the caliper piston, and out of the piston bore.

16. The hydromechanical brake motive apparatus of claim 1, wherein the piston cavity is located at least partially within the piston bore.

17. A hydromechanical brake device, comprising:

the hydromechanical brake motive apparatus of claim 1;

a brake rotor;

a brake pad having a first pad side adjacent the caliper piston, the reciprocal longitudinal motion of the caliper piston selectively placing a second side of the brake pad, longitudinally opposite the first side of the brake pad, into contact with the brake rotor to provide a braking action thereto; and a caliper housing at least partially enclosing the brake pad and brake rotor.

18. The hydromechanical brake device of claim 17, wherein the caliper piston is a first caliper piston and the piston bore is a first piston bore;

wherein the hydromechanical brake motive apparatus includes a second piston bore defined at least partially by the motive housing, the second piston bore being spaced laterally apart from the first piston bore, and a second caliper piston configured for selectively reciprocating longitudinally with respect to the second piston bore under influence of pressurized hydraulic fluid from the power transmission unit; and wherein the first pad side of the brake pad is attached to both the first and second caliper pistons, the reciprocal longitudinal motion of the first and second caliper pistons selectively placing the second side of the brake pad into contact with the brake rotor to provide a braking action thereto.

19. A vehicle, comprising:

at least one wheel;

at least one hydromechanical brake device of claim 17, each hydromechanical brake device being operatively associated with, and co-located in proximity to, a corresponding wheel; and an electronic control unit configured to control operation of the power transmission unit of the at least one hydromechanical brake device.

* * * * *